Sept. 16, 1969    V. C. REES    3,467,947
CONTROL APPARATUS
Original Filed Oct. 14, 1965    2 Sheets-Sheet 1

INVENTOR
VERNON C. REES
BY
Staelin & Overman
ATTORNEYS

Sept. 16, 1969        V. C. REES        3,467,947
CONTROL APPARATUS
Original Filed Oct. 14, 1965        2 Sheets-Sheet 2
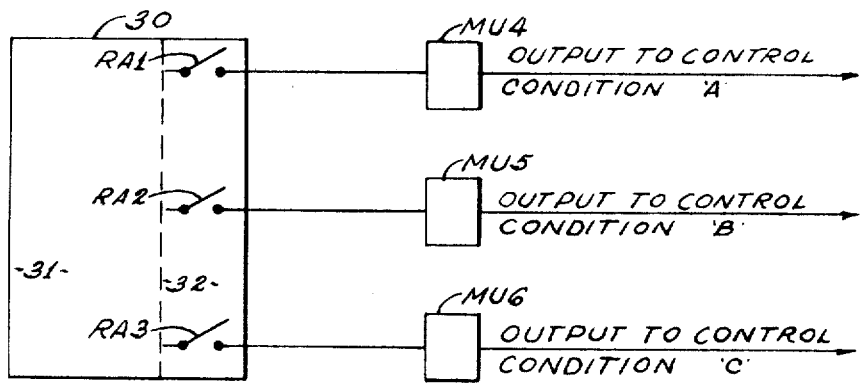
Fig. 3
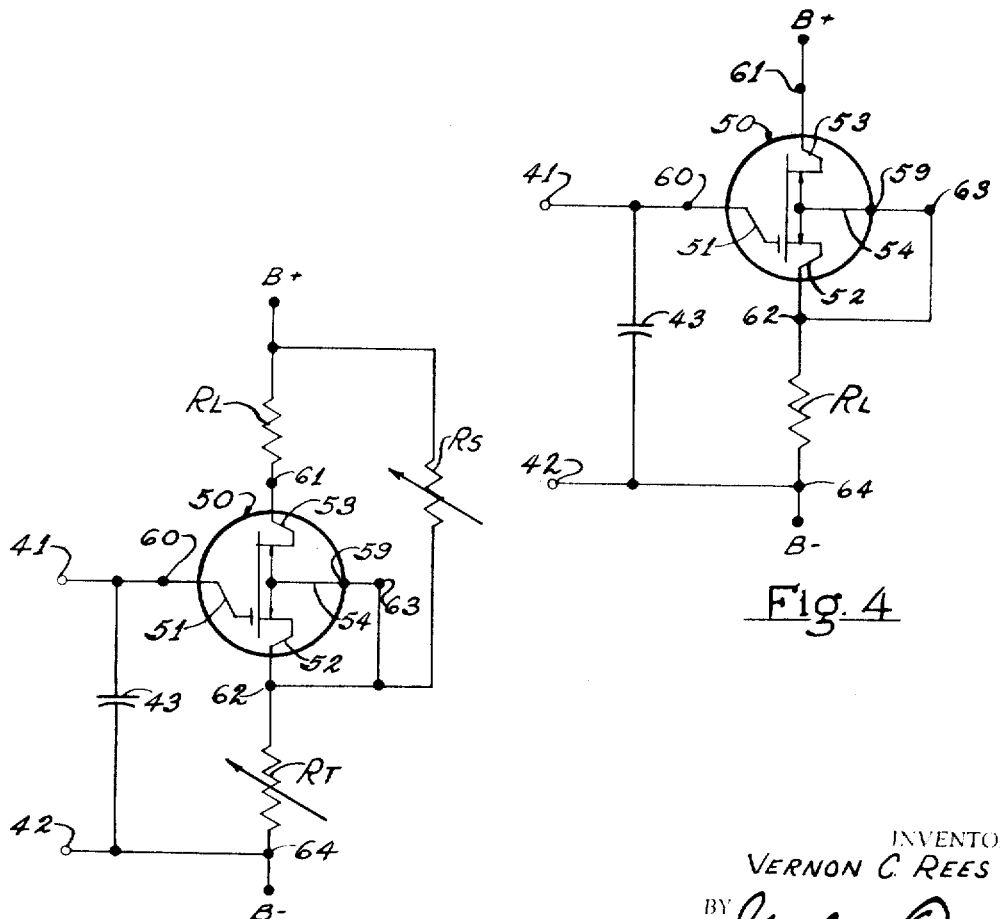
Fig. 4
Fig. 5
INVENTOR.
VERNON C. REES
BY
Staelin & Overman
ATTORNEYS United States Patent Office 3,467,947
Patented Sept. 16, 1969

3,467,947
CONTROL APPARATUS
Vernon C. Rees, Newark, Ohio, assignor to Owens-Corning Fiberglas Corporation, a corporation of Delaware
Continuation of application Ser. No. 495,786, Oct. 14, 1965. This application July 24, 1968, Ser. No. 749,909
Int. Cl. G11b 13/00; G06f 15/20, 1/00
U.S. Cl. 340—172.5                                    19 Claims

ABSTRACT OF THE DISCLOSURE

Apparatus for generating or calculating a succession of separate control signals for controlling respective separate conditions which includes memory means for storing each of the control signals and providing a continuous output signal to each condition being controlled until a new or changed control signal is received by the memory means, the output signal being proportional in magnitude to the last received control signal. A time sharing arrangement for a digital to analog converter for digital control signals is also described. The novel memory means includes a field-effect transistor having a capacitive storage means connected to a gate electrode thereof.

---

This application is a continuation of Ser. No. 495,786, filed Oct. 14, 1965.

The present invention relates to control apparatus in general and, in particular, to control apparatus useful in computerized processes including the use of relatively inexpensive and reliable memory units.

With the continual expansion of automated controls for system operation, emphasis is constantly being placed on low cost components and the reliability of the components. This has resulted in refinement of saturable reactors, more reliable vacuum tube components, and other known components and in the development of new control components such as the semiconductor family. The reactor, the heavy duty vacuum tube, and the semiconductor components' reliability is enhanced since there are no moving parts. This development to the present has concentrated on the component capable of providing a quick, complete response to an input signal. In turn, there is usually connected therewith a relatively fast, substantially one-shot output. There has been a need for a control component which is able to provide a prolonged output signal, which output signal is variable in response to intermittent input signals and for control apparatus which is useful for utilizing such a component. This reliability has been attained in the present invention by the development of a device or unit having no moving parts, but which is capable of providing a sustained and prolonged output with little degree of change even though an input signal is not received for a substantial period of time.

Such a component or unit along with the control apparatus associated therewith is suitable for use, for example, with process valves controlled by computers and, in certain instances, permits the time sharing of a single digital to analog converter with a number of process valves rather than requiring a separate converter for each valve. In a system of this type the computer normally receives process input signals from sensors associated with variables of the process, and from these input signals calculates the adjustments necessary for the process valves to bring the variables to predetermined desired levels.

When the computer is a digital computer each digital computation must be translated to an analog signal for adjustment of its respective valve of the process. The computer makes a quick calculation for each variable and in a fraction of a second supplies a signal for adjustment of one or more valves associated with the variable. The computer then transfers to the next variable and similarly computes and supplies an adjustment or control signal. Heretofore, in prior art systems only the computer was time shared among a number of digital to analog converters each associated with its own process valve to be controlled. According to this invention the multiplicity of digital to analog converters, each for a separate valve, may be replaced with a single digital to analog time shared converter and a memory unit as disclosed hereinafter for each valve or condition to be controlled. Since the memory unit costs substantially less than an analog converter, it may be seen that a considerable savings can be attained without sacrificing reliability and, in fact, adding desirable features.

It is, accordingly, an object of this invention to provide improved control apparatus.

It is a further object of this invention to provide improved control apparatus embodying memory units of this invention capable of providing sustained outputs over a long period of time in response to widely spaced or intermittent input signals.

It is a further object of this invention to provide a simple signal memory unit associated with each condition to be controlled so that a digital computation signal may be converted to analog form by a single time shared digital to analog converter and fed to a memory unit which will quickly receive and remember the adjustment to be made for the condition which it is controlling.

In providing the above objects the control apparatus of this invention features means for providing a plurality of individual control signals, a plurality of memory units corresponding in number to the control signals for storing the control signals, and means responsive to the readout of an individual control signal for connecting the control signal to its corresponding memory unit. Each memory unit advantageously includes an electronic valve means having a very high resistance or impedance and further includes a control electrode means, a plate electrode means and a cathode electrode means. A capacitive storage means is connected to the control electrode means. Means are provided for connecting an output means and source voltage means in circuit with the plate electrode means and the cathode electrode means. The capacitive means is thus operative to receive and store a control signal applied to the control electrode means, thereby controlling the output of the memory means to the output means.

In the preferred embodiment of this invention the electronic valve means comprises a silicon insulated-gate, field-effect transistor means having a second control electrode means operated at substantially the same potential as the cathode electrode means.

If the plurality of individual control signals are provided in digital form, as from a digital computer, the control apparatus further includes a single digital to analog converter means for converting the plurality of digital control signals to a like plurality of analog control signals for storage in the plurality of memory units. The readout responsive means then further includes means responsive to the readout of an individual digital control signal to the converter means for directing the resulting analog control signal to the proper corresponding memory unit.

Other objects, advantages and features of the present invention will become readily apparent when the following description is taken in conjunction with the accompanying drawings, in which:

FIGURE 3 illustrates diagrammatically a second embodiment of the teachings of this invention;

FIGURE 4 is a circuit diagram of memory component suitable for use in the present invention; and FIGURE 5 is a circuit diagram of a second embodiment of a memory component illustrating the teachings of this invention.

Figure 1:
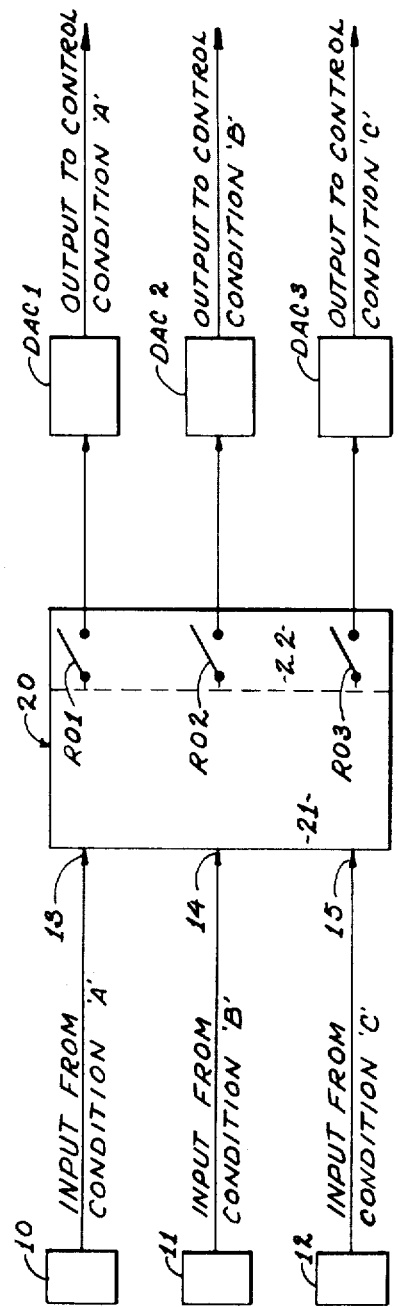
FIGURE 1 illustrates diagrammatically a prior art control apparatus.

Referring to FIGURE 1 there is diagrammatically illustrated control apparatus utilized in the prior art in similar applications. A plurality of sensor means 10, 11 and 12 provide a plurality of inputs 13, 14 and 15 from conditions A, B and C being measured. The inputs 13, 14 and 15 are supplied to a digital computer 20 having a calculator section 21 and a readout section 22. As an adjustment signal is computed in response to the input 13 from condition A, a readout switching means RO1 closes to supply the digital control signal to a digital to analog converter DAC1. The analog control signals is supplied from a suitable output to control condition A, for example, the adjustment of a valve, etc. Similarly, the calculator section 21 of the computer 20 is responsive to inputs 14 and 15 from conditions B and C to calculate adjustment signals if necessary. These adjustment signals are supplied from the readout section 22 of the computer 20 via switches RO2 and RO3 to the digital to analog converters DAC2 and DAC3. The outputs from the converters DAC2 and DAC3 are supplied to control the conditions B and C, respectively, via appropriate condition controlling means such as the valves hereinbefore mentioned.

While the control apparatus or system illustrated in FIGURE 1 operates effectively, a considerable amount of capital investment is tied up in having the requirements of a digital to analog converter for each output to control the plurality of conditions. Control apparatus is illustrated in FIGURE 2 for overcoming the difficulties heretofore encountered in keeping the cost of such systems down and providing other features to be discussed.

Figure 2:
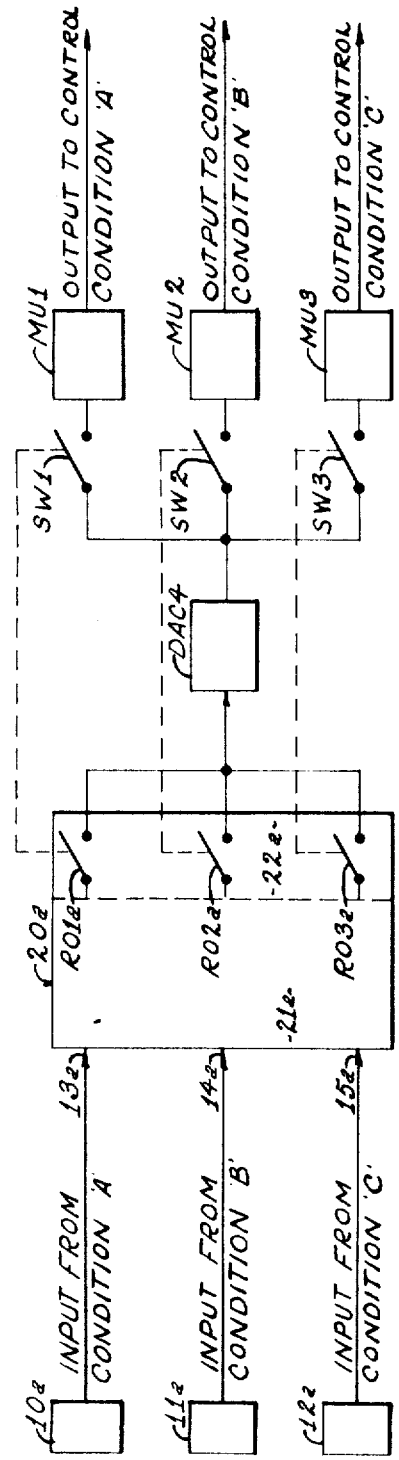
FIGURE 2 illustrates diagrammatically a first embodiment of the present invention.

Referring to FIGURE 2 there is illustrated a system which utilizes sensors 10a, 11a and 12a to provide input signals 13a, 14a and 15a to a digital computer 20a. In response to the inputs 13a, 14a and 15a from conditions A, B and C a calculator section 21a of the computer 20a calculates any adjustment signals or variations required. A readout section 22a of the computer 20a similarly to the system illustrated in FIGURE 1 has switches RO1a, RO2a and RO3a for reading out the ajustment signals arrived at by the calculator section 20a.

The system of FIGURE 2 differs from that shown in FIGURE 1 in that only a single digital to analog converter DAC4 is utilized. In addition memory units MU1, MU2 and MU3 are utilized to provide outputs to control the conditions A, B and C. There is further provided switching means SW1, SW2 and SW3, responsive to the readout of a digital control signal to the digital to analog converter DAC4 for directing the resulting analog control signal to the proper corresponding memory means.

Assume that an input 13a has been received from the condition A being monitored by a sensor 10a. The calculator section 21a of the computer 20a calculates any adjustment necessary and closes a readout switching means RO1a in the readout section 22a to provide a digital control signal. The digital control signal from RO1a is directed to the single digital to analog converter DAC4 and an analog output control signal results. For purposes of simplicity in showing the invention the readout switching means RO1a, RO2a and RO3a are shown as ganged with the switching means SW1, SW2 and SW3, respectively, to provide responsive connections to the corresponding memory unit. That is, when a readout occurs from the readout section 22a via, for example, switching means RO1a the switching means SW1 is also closed so that the analog control signal resulting from the conversion is supplied to the memory unit MU1 to control the condition A. Similarly, switching means SW2 is responsive to the readout of a digital control signal from RO2a and channels the resulting analog signal to the memory unit MU2. This is repeated for as many loops or channels as desired in a control system.

Referring to FIGURE 3, there is illustrated diagrammatically a system in which the memory unit of this invention may be utilized with an analog computer. The analog computer 30 may have a calculator section 31 and a readout section 32, and is operative to receive a plurality of inputs (not shown) from a plurality of conditions being sensed and controlled. Such inputs may result from sensors as illustrated in FIGURES 1 and 2 but for purposes of drawing simplicity the sensors have not been repeated here. The readout section 32 of the computer 30 may also similarly to those illustrated hereinbefore have a plurality of switching means RA1, RA2 and RA3 for connecting a particular calculated control signal to a condition or variable such as a valve to be controlled. The calculations are performed over spaced periods of time and the readout section may direct a particular output to a memory unit such as those illustrated at MU4, MU5 and MU6, of this invention for retention and to provide an output to control the variables for the conditions A, B and C. Since an analog computer is generally slower, particularly when calculating a plurality of adjustments for a plurality of conditions to be controlled, the memory units are particularly useful in conjunction with an analog computer as control apparatus for processes.

Referring to FIGURE 4 there is illustrated in circuit diagram a memory unit component or means embodying the teachings of this invention. The memory unit is adapted to receive input signals of very short duration and provide output signals, proportional in magnitude to the last received input signal, over long periods of time. The unit comprises an electronic valve means generally indicated at 50 having a very high input resistance and including a control or gate electrode means 51, a plate or drain electrode means 53, a cathode or source electrode means 52, and a second control or substrate and case electrode means 54. Terminal means 61, 62 and 64 provide means for connecting an output means $R_L$ and source voltage means such as B+ and B— voltage sources in circuit with the plate or drain electrode means and the cathode and source electrode means. A capacitive storage means 43 is connected to the control electrode means 51 via terminal means 60. Terminal means 41 and 42 provide means for applying an input signal to the control electrode means 51. The capacitive means 43 is operative to receive and store input signals applied to terminals 41, 42 and thus to the control electrode means 51 thereby controlling the output of the memory means to the output means $R_L$.

The electronic valve means utilized in this invention may be any electronic valve means having a high input resistance or impedance and capable of providing the same operation as required in the example set forth. Advantageously an electronic valve means of the silicon insulated-gate, field-effect transistor means such as the 3N98 and 3N99 commercially available from the Radio Corporation of America may be used in this application. These transistors have the gate offset toward the source to provide substantially reduced feedback capacitance, and a very high input resistance (in the order of $10^{15}$ ohms). The devices are relatively insensitive to temperature. The combination of low device capacitance and very high input impedance makes this particular electronic valve means especially useful in this application. As will be noted in FIGURE 4 the second control or substrate and case electrode means 54 is connected to the terminal 62 via terminal 63 to insure that this electrode means operates at substantially the same potential as the cathode or source electrode means 52. Further, via a connection 59 the second control electrode or substrate means is connected to the case of the electronic valve means 50.

In operation, current flow from electrode 53 to electrode 52 is controlled by the signal present at electrode 51.

Referring to FIGURE 5 there is illustrated a rearrangement of the connections of the electronic valve means 50 with the source voltages B+ and B— with respect to the load resistance $R_L$. That is, the output means $R_L$ has been moved to a series connection with the plate or drain electrode means 53 and the B+ supply. This contrasts with the series connection of the output means $R_L$ in FIGURE 4 with the cathode or source electrode means 52. The arrangement illustrated in FIGURE 4 provided a gain of less than one, but also provided a very stable output. The arrangement illustrated in FIGURE 5 provides for a gain of more than one in applications where amplification is desired from the memory unit itself. A trimming resistance $R_T$ is included in series with the cathode or source electrode means 52 so that the output of a plurality of the memory units may be trimmed to be substantially the same. A zero adjustment resistor $R_S$ is connected from the B+ supply around the output means or load $R_L$ to terminal 62. That is, $R_S$ is connected between the cathode electrode means and the plate electrode means via the output means. This allows the establishment of a "bias" voltage for the amplifying portion of the memory unit. This provides a predetermined "zero" or starting level for the output signal. The adjustable resistors $R_S$ and $R_T$ therefore provide "zero" and "span" adjustments so that the units may be interchanged between various circuits without regard to the manufacturing tolerances in the electronic valve and other components.

In review, it is seen that there has been described herein novel control apparatus comprising a plurality of means for sensing a like plurality of conditions and generating a like plurality of input signals proportional to the condition sensed. Computer means are utilized for calculating a plurality of control signals in response to each of the plurality of input signals. A plurality of memory means, such as illustrated in FIGURES 4 and 5, corresponding in number to the plurality of control signals, are provided for storing each of the plurality of control signals. There is further provided readout means for connecting each control signal to its corresponding memory means for storage. This describes the system set forth in FIGURE 3. The system illustrated in FIGURE 2 differs from that of FIGURE 3 in that the computer means provides digital control signals. The control apparatus then further includes a single digital to analog converter means for converting the plurality of control signals to a like plurality of analog control signals for storage in the plurality of memory means such as illustrated in FIGURES 4 and 5. The control apparatus of FIG. 2 further includes means responsive to the readout of a digital control signal to the digital to the analog converter means for directing a resulting analog control signal to the proper corresponding memory means. That is, one memory unit may be associated with each valve or other condition being controlled and the digital computer and the analog converter would be connected for time sharing among all memory units.

The memory units illustrated in this invention are adapted to receive and record an instantaneous signal corresponding in magnitude to a computed value for its valve or other condition being controlled and hold the recorded value for use by the valve after the converter has been switched to a subsequent branch or loop for which the system is to act similarly. The high impedance input of the electronic valve means allows a signal charged into a good quality condenser to be recorded and fed from the condenser to the valve or other condition being controlled for adjustment without draining the condenser of the signal supplied to it. The memory unit comprises an electronic valve having a gate or control electrode, a plate or positive electrode, a cathode or negative electrode; and an input storage means connected to the gate or control electrode. Tests have shown that the memory unit permits signals to be recorded and fed to a valve or other control medium while at the same time holding the recorded values for 24 hours within 1% of their original value. Thus a novel memory unit for receiving input signals of very short duration and providing output signals, proportional in magnitude to the last received input signal, over long periods of time has been described and disclosed herein.

In conclusion it is pointed out that while the illustrated examples constitute practical embodiments of my invention, I do not limit myself to the exact details shown since modification may be made without departing from the spirit and scope of this invention.

I claim:

1. Control apparatus comprising a plurality of means for sensing a like plurality of separate conditions and generating a like plurality of separate input signals proportional to the conditions sensed, computer means for calculating a succession of separate control signals in response to each of said plurality of input signals; a memory means for each of said successions of control signals for storing said control signals and providing an output proportional in magnitude to a stored signal for controlling a condition, and readout means for connecting each said control signal to its corresponding memory means for storage, each memory means comprising a field effect transistor means having a gate electrode means, a drain electrode means, and a source electrode means, capacitive storage means connected to said gate electrode means, means for connecting source voltage means to said drain electrode means and said source electrode means via an output means, said capacitive means being operative to receive and store a control signal applied to said gate electrode means thereby controlling the output of said memory means to an output means.

2. Control appartus as defined in claim 1 in which said transistor means further includes a substrate electrode means operated at substantially the same potential as said source electrode means.

3. Control apparatus as defined in claim 1 in which said transistor means comprising a field effect transistor means having an insulated gate providing a very high input impedance.

4. Control apparatus as defined in claim 1 in which said computer means performs digital calculations to obtain said control signals; said control apparatus further including a single means for converting said plurality of digital control signals to analog control signals for storage in said plurality of memory means; said readout means further including switching means operative to connect a single digital control signal to said digital to analog converter means while connecting the corresponding memory means to receive the output of said converter means to time share said single converter means between said memory means while said memory means are providing continuous output signals to control said conditions.

5. A memory unit for receiving and storing input signals which may be of different magnitudes and providing an output signal dependent in magnitude upon the last received input signal over a long period of time comprising a field effect transistor means having a very high input impedance and including a gate electrode means, a drain electrode means, and a source electrode means; capacitive storage means connected to said gate electrode means; and means for connecting an output means and source voltage means in circuit with said drain electrode means and said source electrode means; said capacitive means being operative to receive and store input signals applied to said gate electrode means thereby enabling said memory means to provide a continuous output to said output means.

6. A memory unit as defined in claim 5 in which said transistor means further includes a substrate electrode means operated at substantially the same potential as said source electrode means.

7. A memory unit as defined in claim 6 in which substrate electrode means is connected to said source electrode means.

8. A memory unit as defined in claim 5 in which said transistor means comprises an insulated-gate, field effect transistor means.

9. A memory unit as defined in claim 5 in which said output means is connected in series with said source electrode means and said capacitive storage means is connected between said gate electrode means and said output means.

10. A memory unit as defined in claim 9 in which said substrate electrode means is connected to said cathode electrode means.

11. A memory unit as defined in claim 5 in which said output means is connected in series with said drain electrode means.

12. A memory unit as defined in claim 5 which further includes trimming resistance means connected between said source electrode means and said connecting means for said source voltage means, and zero adjustment resistance means connected between said source electrode means and said drain electrode means via said output means.

13. Control apparatus comprising means for successively providing a plurality of individual control signals; a memory unit for each of said plurality of control signals for storing each of said control signals; and means responsive to the readout of an individual control signal for connecting said control signal to its corresponding memory unit; each memory unit including a field-effect transistor means having a very high input impedance and gate electrode means, drain electrode means, and source electrode means; said memory unit further including capacitive storage means connected to said gate electrode means, and means for connecting an output means and source voltage means in circuit with said drain electrode means and said source electrode means; said capacitive means being operative to receive and store a control signal applied to said gate electrode means thereby enabling said memory means to provide a continuous output to said output means which is proportional to the last received control signal.

14. Control apparatus as defined in claim 13 in which said transistor means further includes substrate electrode means operated at substantially the same potential as said source electrode means.

15. Control apparatus as defined in claim 13 in which said transistor means comprises an insulated-gate field effect transistor means.

16. Control apparatus according to claim 13 in which said plurality of individual control signals are provided in digital form; said control apparatus further including a single digital to analog converter means for converting said plurality of digital control signals to a like plurality of analog control signals for storage in said plurality of memory units, said readout responsive means further including means responsive to readout of an individual digital control signal to said converter means for directing the analog control signal resulting from the converter to the proper corresponding memory unit.

17. Control apparatus according to claim 16 in which said transistor means comprises an insulated-gate, field-effect transistor means having substrate electrode means operated at substantially the same potential as said source electrode means.

18. Control apparatus comprising a plurality of means for sensing a like plurality of separate conditions and generating a like plurality of separate input signals proportional to the conditions sensed, computer means for calculating separate control signals in response to each of said plurality of input signals, a memory means for each of said plurality of control signals for storing each of said plurality of control signals and providing a continuous output proportional in magnitude to a stored control signal for controlling one of said conditions, and means for connecting each said control signal to its corresponding memory means for storage.

19. Control apparatus as defined in claim 18 in which said computer means provides digital control signals, said control apparatus further including a single digital to analog converter means for converting said digital control signals to analog control signals for storage in said plurality of memory means, said connecting means including switching means for sequentially connecting each digital control signal to said converter means and for connecting the resulting analog control signal from said converter means to the proper corresponding memory means to time share said converter means.

References Cited

UNITED STATES PATENTS

| | | | |
|---|---|---|---|
| 3,086,708 | 4/1963 | Berkowitz et al. | 235—151.1 X |
| 3,150,302 | 9/1964 | Baumoel. | |
| 3,201,572 | 8/1965 | Yetter | 235—151 |
| 3,260,998 | 7/1966 | Fleugel | 235—151 X |
| 3,391,275 | 7/1968 | Bullock et al. | 235—151.1 |

ROBERT C. BAILEY, Primary Examiner

P. R. WOODS, Assistant Examiner

U.S. Cl. X.R.

235—151; 340—147, 173